(12) United States Patent
Gimblet et al.

(10) Patent No.: US 8,995,809 B2
(45) Date of Patent: Mar. 31, 2015

(54) FIBER OPTIC CABLES WITH ACCESS FEATURES

(71) Applicant: Corning Optical Communications LLC, Hickory, NC (US)

(72) Inventors: Michael John Gimblet, Conover, NC (US); Julian Latelle Greenwood, III, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 36 days.

(21) Appl. No.: 14/249,597

(22) Filed: Apr. 10, 2014

(65) Prior Publication Data

US 2015/0049993 A1    Feb. 19, 2015

Related U.S. Application Data

(63) Continuation of application No. 14/041,393, filed on Sep. 30, 2013, now Pat. No. 8,737,787, which is a continuation of application No. 13/845,663, filed on Mar. 18, 2013, now Pat. No. 8,582,939, which is a continuation of application No. PCT/US2011/062002, filed on Nov. 23, 2011.

(60) Provisional application No. 61/416,684, filed on Nov. 23, 2010.

(51) Int. Cl.
*G02B 6/44* (2006.01)
(52) U.S. Cl.
CPC ................................. *G02B 6/4497* (2013.01)
USPC .......................................................... 385/100

(58) Field of Classification Search
USPC .......................................................... 385/100
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster ................. 260/47 |
| 4,067,852 A | 1/1978 | Calundann ..................... 260/47 |
| 4,083,829 A | 4/1978 | Calundann et al. ............ 260/47 |
| 4,130,545 A | 12/1978 | Calundann ................... 260/40 P |
| 4,237,337 A | 12/1980 | Serrander ................... 174/70 R |
| 4,248,824 A | 2/1981 | Hattop ......................... 264/171 |
| 4,318,842 A | 3/1982 | East et al. ..................... 524/605 |
| 4,456,331 A | 6/1984 | Whitehead et al. ........ 350/96.23 |
| 4,468,364 A | 8/1984 | Ide ............................ 264/176 R |

(Continued)

FOREIGN PATENT DOCUMENTS

| | | | |
|---|---|---|---|
| DE | 4421456 A1 | 12/1995 | ............. B29C 47/02 |
| EP | 0647866 A1 | 4/1995 | ............... G02B 6/44 |

(Continued)

OTHER PUBLICATIONS

Patent Cooperation Treaty, International Search Report and Written Opinion for International Application No. PCT/US2011/062002; Mailing Date Sep. 12, 2012—16 pages.

(Continued)

*Primary Examiner* — Jerry Blevins (57) ABSTRACT

Cables are constructed with discontinuities in the cable jacket that allow the jacket to be torn to provide access to the cable core. The discontinuities can be longitudinally extending strips of material in the cable jacket. The discontinuities allow a section of the cable jacket to be pulled away from a remainder of the jacket using a relatively low peel force.

20 Claims, 7 Drawing Sheets

(56) References Cited

U.S. PATENT DOCUMENTS

| | | | | |
|---|---|---|---|---|
| 4,707,074 | A | 11/1987 | Heywood | 350/96.23 |
| 4,729,628 | A | 3/1988 | Kraft et al. | 350/96.23 |
| 4,848,868 | A | 7/1989 | Rohner | 350/96.23 |
| 5,218,659 | A | 6/1993 | Schneider | 385/110 |
| 5,360,497 | A | 11/1994 | Schneider et al. | 156/47 |
| 5,442,722 | A | 8/1995 | DeCarlo | 385/114 |
| 5,636,308 | A | 6/1997 | Personne et al. | 385/102 |
| 5,651,081 | A | 7/1997 | Blew et al. | 385/101 |
| 5,717,805 | A | 2/1998 | Stulpin | 385/114 |
| 5,737,470 | A | 4/1998 | Nagano et al. | 385/114 |
| 5,970,196 | A | 10/1999 | Greveling et al. | 385/114 |
| 5,987,204 | A | 11/1999 | Lee et al. | 385/100 |
| 6,041,153 | A | 3/2000 | Yang | 385/109 |
| 6,088,499 | A | 7/2000 | Newton et al. | 385/112 |
| 6,137,936 | A | 10/2000 | Fitz et al. | 385/113 |
| 6,167,180 | A | 12/2000 | Keller | 385/113 |
| 6,222,969 | B1 | 4/2001 | Botelho et al. | 385/114 |
| 6,311,000 | B1 | 10/2001 | Schneider | 385/113 |
| 6,351,589 | B1 | 2/2002 | Leggett | 385/128 |
| 6,404,962 | B1 | 6/2002 | Hardwick, III et al. | 385/114 |
| 6,519,396 | B2 | 2/2003 | Schneider et al. | 385/101 |
| 6,542,674 | B1 | 4/2003 | Gimblet | 385/112 |
| 6,545,222 | B2 | 4/2003 | Yokokawa et al. | 174/110 R |
| 6,546,176 | B2 | 4/2003 | Anderson et al. | 385/113 |
| 6,563,991 | B1 | 5/2003 | Witt et al. | 385/107 |
| 6,603,908 | B2 | 8/2003 | Dallas et al. | 385/109 |
| 6,661,956 | B2 | 12/2003 | Yamasaki et al. | 385/109 |
| 6,704,481 | B2 | 3/2004 | Gaillard et al. | 385/113 |
| 6,728,455 | B2 | 4/2004 | Kusakari et al. | 385/113 |
| 6,760,522 | B2 | 7/2004 | Okada et al. | 385/109 |
| 6,766,091 | B2 | 7/2004 | Beuth et al. | 385/128 |
| 6,813,421 | B2 | 11/2004 | Lail et al. | 385/101 |
| 6,876,798 | B2 | 4/2005 | Triplett et al. | 385/100 |
| 6,957,000 | B2 | 10/2005 | McAlpine et al. | 385/102 |
| 7,029,137 | B2 | 4/2006 | Lionetti et al. | 362/84 |
| 7,050,685 | B2 | 5/2006 | Plemmons et al. | 385/109 |
| 7,085,459 | B2 | 8/2006 | Conrad et al. | 385/114 |
| 7,116,872 | B2 | 10/2006 | Okuno et al. | 385/114 |
| 7,123,801 | B2 | 10/2006 | Fitz | 385/105 |
| 7,136,556 | B2 | 11/2006 | Brown et al. | 385/102 |
| 7,187,830 | B2 | 3/2007 | Blazer | 385/114 |
| 7,197,215 | B2 | 3/2007 | Baird et al. | 385/113 |
| 7,218,821 | B2 | 5/2007 | Bocanegra et al. | 385/103 |
| 7,225,534 | B2 | 6/2007 | Kachmar | 29/825 |
| 7,251,411 | B1 | 7/2007 | Lu et al. | 385/147 |
| 7,346,244 | B2 | 3/2008 | Gowan et al. | 385/113 |
| 7,379,642 | B2 | 5/2008 | Kachmar | 385/102 |
| 7,391,943 | B2 | 6/2008 | Blazer et al. | 385/100 |
| 7,400,810 | B2 | 7/2008 | Tanaka et al. | 385/134 |
| 7,403,685 | B2 | 7/2008 | Wells | 385/100 |
| 7,415,181 | B2 | 8/2008 | Greenwood et al. | 385/100 |
| 7,424,189 | B2 | 9/2008 | Lu et al. | 385/100 |
| 7,471,862 | B2 | 12/2008 | Bringuier et al. | 385/113 |
| 7,480,436 | B2 | 1/2009 | Wells et al. | 385/134 |
| 7,489,843 | B2 | 2/2009 | Carlson et al. | 385/100 |
| 7,532,796 | B2 | 5/2009 | Chiasson | 385/114 |
| 7,539,380 | B1 | 5/2009 | Abernathy et al. | 385/100 |
| 7,567,741 | B2 | 7/2009 | Abernathy et al. | 385/113 |
| 7,587,111 | B2 | 9/2009 | de Montmorillon et al. | 385/102 |
| 7,590,321 | B2 | 9/2009 | Lu et al. | 385/104 |
| 7,603,012 | B1 | 10/2009 | Ice | 385/103 |
| 7,623,747 | B2 | 11/2009 | De Montmorillon et al. | 385/124 |
| 7,693,375 | B2 | 4/2010 | Freeland et al. | 385/100 |
| 7,787,727 | B2 | 8/2010 | Bringuier et al. | 385/113 |
| 7,796,853 | B2 | 9/2010 | Abernathy et al. | 385/100 |
| 7,817,891 | B2 | 10/2010 | Lavenne et al. | 385/109 |
| 2003/0118295 | A1 | 6/2003 | Lail et al. | 385/101 |
| 2006/0045443 | A1 | 3/2006 | Blazer | 385/114 |
| 2006/0127016 | A1 | 6/2006 | Baird et al. | 385/113 |
| 2006/0291787 | A1 | 12/2006 | Seddon | 385/113 |
| 2008/0013899 | A1 | 1/2008 | Gowan et al. | 385/113 |
| 2008/0193092 | A1 | 8/2008 | Greenwood et al. | 385/113 |
| 2009/0087148 | A1 | 4/2009 | Bradley et al. | 385/76 |
| 2009/0274425 | A1 | 11/2009 | Caldwell et al. | 385/102 |
| 2009/0274426 | A1 | 11/2009 | Lail | 385/105 |
| 2009/0317039 | A1 | 12/2009 | Blazer et al. | 385/107 |
| 2009/0324182 | A1 | 12/2009 | Kachmar et al. | 385/104 |
| 2010/0132973 | A1 | 6/2010 | Fitz et al. | 174/102 R |
| 2011/0091173 | A1* | 4/2011 | Register, III | 385/113 |
| 2011/0217010 | A1 | 9/2011 | Kachmar | 385/111 |
| 2011/0229098 | A1 | 9/2011 | Abernathy et al. | 385/102 |
| 2013/0094821 | A1 | 4/2013 | Logan | 385/100 |
| 2013/0230287 | A1* | 9/2013 | Abernathy et al. | 385/100 |

FOREIGN PATENT DOCUMENTS

| | | | | |
|---|---|---|---|---|
| EP | 0749129 | A1 | 12/1996 | H01B 7/00 |
| EP | 1168024 | B1 | 6/2006 | G02B 6/44 |
| EP | 1376156 | B1 | 7/2006 | G02B 1/04 |
| JP | 60-91306 | A | 5/1985 | G02B 6/24 |
| JP | 63-120206 | U | 8/1988 | G02B 6/08 |
| JP | 9-230184 | A | 9/1997 | G02B 6/44 |
| JP | 2005-148373 | A | 6/2005 | G02B 6/44 |
| JP | 2005-345622 | A | 12/2005 | G02B 6/44 |
| JP | 2006-162703 | A | 6/2006 | G02B 6/44 |
| JP | 2006-171570 | A | 6/2006 | G02B 6/44 |
| JP | 2006-251769 | A | 9/2006 | G02B 6/44 |
| JP | 2006-251770 | A | 9/2006 | G02B 6/44 |
| JP | 2006-267600 | A | 10/2006 | G02B 6/44 |
| JP | 2007-272006 | A | 10/2007 | G02B 6/44 |
| JP | 2009-37150 | A | 2/2009 | G02B 6/44 |
| JP | 2009-258153 | A | 11/2009 | G02B 6/44 |
| KR | 2006-0081266 | | 7/2006 | G02B 6/44 |
| KR | 2006-0107414 | | 10/2006 | G02B 6/02 |
| WO | WO 03/046074 | A1 | 6/2003 | C08L 23/16 |
| WO | WO 2004/021367 | A2 | 3/2004 | H01B 7/00 |
| WO | WO 2005/096053 | A1 | 10/2005 | G02B 6/44 |
| WO | WO 2006/097540 | A1 | 9/2006 | G02B 6/44 |
| WO | WO 2011/109498 | A2 | 9/2011 | |
| WO | WO 2011/137236 | A1 | 11/2011 | B29C 47/02 |
| WO | WO 2012/058181 | A1 | 5/2012 | G02B 6/44 |
| WO | WO 2012/071490 | A2 | 5/2012 | B29C 47/02 |

OTHER PUBLICATIONS

USPTO, Non-Final Rejection for U.S. Appl. No. 13/845,697, Notification Date Aug. 9, 2013, 7 pages.

Response to Non-Final Rejection for U.S. Appl. No. 13/845,697, Mailing Date Aug. 9, 2013, 6 pages.

USPTO, Notice of Allowance for U.S. Appl. No. 13/845,697, Mailing Date Sep. 4, 2013, 8 pages.

USPTO, Restriction Requirement for U.S. Appl. No. 13/445,517, Notification Date Oct. 10, 2013, 9 pages.

Response to Restriction Requirement for U.S. Appl. No. 13/445,517, Mailing Date Oct. 11, 2013, 1 page.

USPTO, Notice of Allowance for U.S. Appl. No. 13/445,517, Mailing Date Nov. 12, 2013, 12 pages.

USPTO, Non-Final Rejection for U.S. Appl. No. 14/023,051, Notification Date Feb. 28, 2014, 9 pages.

Response to Non-Final Rejection for U.S. Appl. No. 14/023,051, Mailing Date Mar. 6, 2014, 9 pages.

USPTO, Non-Final Rejection for U.S. Appl. No. 13/845,663, Notification Date Aug. 5, 2013, 8 pages.

Response to Non-Final Rejection for U.S. Appl. No. 13/845,663, Mailing Date Aug. 5, 2013, 4 pages.

USPTO, Notice of Allowance for U.S. Appl. No. 13/845,663, Mailing Date Sep. 20, 2013, 9 pages.

U.S. Appl. No. 13/445,517, filed Apr. 12, 2012, Eric R. Logan, 29 pages.

U.S. Appl. No. 13/489,901, filed Jun. 6, 2012, Michael J. Gimblet, 23 pages.

U.S. Appl. No. 13/560,374, filed Jul. 27, 2012, Michael John Gimblet, 24 pages.

U.S. Appl. No. 13/646,962, filed Oct. 8, 2012, Anne Germaine Bringuier, 26 pages.

U.S. Appl. No. 13/658,404, filed Oct. 23, 2012, Michael John Gimblet, 21 pages.

(56) References Cited

OTHER PUBLICATIONS

U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4$^{th}$ Version, Jul. 29, 2002, 56 pages.
Renka Corporation, Single Mode Optical Fiber Cable, Specification No. RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.

* cited by examiner

FIBER OPTIC CABLES WITH ACCESS FEATURES

PRIORITY APPLICATIONS

This Application is a continuation of U.S. application Ser. No. 14/041,393 filed Sep. 30, 2013, which is a continuation of U.S. application Ser. No. 13/845,663 filed on Mar. 18, 2013, which issued on Nov. 12, 2013 as U.S. Pat. No. 8,582,939 and which is a continuation of International Application No. PCT/US2011/062002 filed on Nov. 23, 2011, which claims the benefit of priority to U.S. Application No. 61/416,684, filed on Nov. 23, 2010, the content of each which is relied upon and incorporated herein by reference in its entirety.

BACKGROUND

1. Field of the Disclosure

A fiber optic cable is disclosed, specifically a fiber optic cable having access features for accessing a core of the fiber optic cable.

2. Technical Field

Fiber optic cables frequently require that the fibers inside are accessed mid-span rather than at an end of the cable. This often requires the cable jacket to be cut and a portion of the jacket to be removed, allowing access to the fibers inside the jacket. Conventional cutting tools, such as box cutters or custom cutting tools, can be cumbersome and dangerous, both to the operator and to the delicate fibers. Rip cords in a cable jacket can be used for cable access, but they add cost and require time and training in order for the craftsman to use them properly. In one conventional access process, a jacket is pierced using a first tool, and a second tool is used to "fish" out enough of the rip cord so that a third tool (e.g., pliers) can grasp the rip cord. A pull force must then be applied to the rip cord, tearing it through the jacket material. The jacket material is then peeled away from the cable core and removed. If the rip cord breaks, the cord must be "fished" out again.

SUMMARY

According to a first embodiment, a cable comprises a core including a plurality of optical fibers and a jacket surrounding the core. The jacket has an interior surface and an exterior surface with a jacket thickness therebetween of at least 0.5 mm and/or no more than 2.0 mm. The jacket includes a main portion of a polymeric first extruded material, and at least a first and a second discontinuity of a second extruded material disposed in the main portion, each discontinuity having a bond with the main portion, with a section of the main portion located between the first and second discontinuities being separable from a remainder of the jacket by a peel force exerted on the section. The peel force may be relatively low to allow ease of access to the cable core. The peel force can be less than 80 Newtons and/or at least 10 Newtons, for example, and may fall in the range of 20-40 Newtons.

The at least one discontinuity may extend substantially along the entire length of the cable, or along a selected length of the cable to provide access to the core.

The first polymer may be a polyethylene and the second extruded material may be a polypropylene/polyethylene blend, the blend including from about 6% to about 20% by weight of the polyethylene.

The cable can include two discontinuities that are angularly spaced in the cable jacket. The discontinuities can be spaced at selected angles to provide varying degrees of required peel force.

It is to be understood that both the foregoing general description and the following detailed description are merely exemplary, and are intended to provide an overview or framework to understand the nature and character of the claims.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Reference is now made in detail to the present preferred embodiments of the disclosure, examples of which are illustrated in the accompanying drawings. Whenever possible, identical or similar reference numerals are used throughout the drawings to refer to identical or similar parts.

Figure 1:
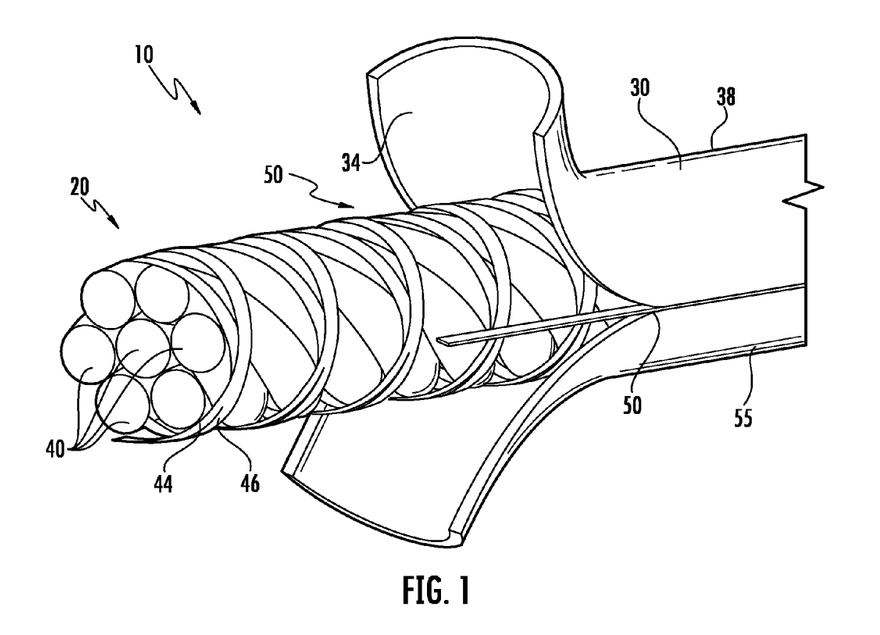
FIG. 1 is a partial cutaway view of a fiber optic cable according to a first embodiment.

FIG. 1 is a partial cutaway view of a fiber optic cable 10 according to a present embodiment. The cable 10 comprises a core 20 surrounded by a jacket 30. The jacket 30 has an interior surface 34 that faces the core 20, and an exterior surface 38. The jacket 30 can be formed primarily from polymer materials, and can be generally referred to as "polymeric." In this specification, the terms "polymer" and "polymeric" indicate materials comprised primarily of extrudable polymer materials such as, for example, copolymers, but allows for the presence of non-polymer materials such as additives and fillers. The core 20 can be, for example, an assembly or arrangement having data-transmission and/or power-transmission capabilities. In the illustrated embodiment, the core 20 includes a bundle of optical fibers 40 bundled within contrahelically wound binders 44, 46, the optical fibers being capable of conveying optical data.

The jacket 30 includes a separation feature that facilitates access to the core 20. In the exemplary embodiment, the separation feature is a pair of extruded discontinuities 50 that extend along the length of the cable 10. In this specification, the term "discontinuity" indicates a portion of the jacket 30 of different material composition than the main portion of the jacket 30, the main portion being indicated by reference number 55. The main portion 55 can essentially be an annular hoop surrounding the core 20, with the discontinuities 50 extending longitudinally through the main portion 55 along a selected length of the cable 10. According to one aspect, the discontinuities 50 provide lines of weakness that allow the jacket 30 to be separated as shown in FIG. 1. The illustrated discontinuities 50 along the entire cable length, although shorter lengths may be used to provide access to the core 20.

Figure 2:
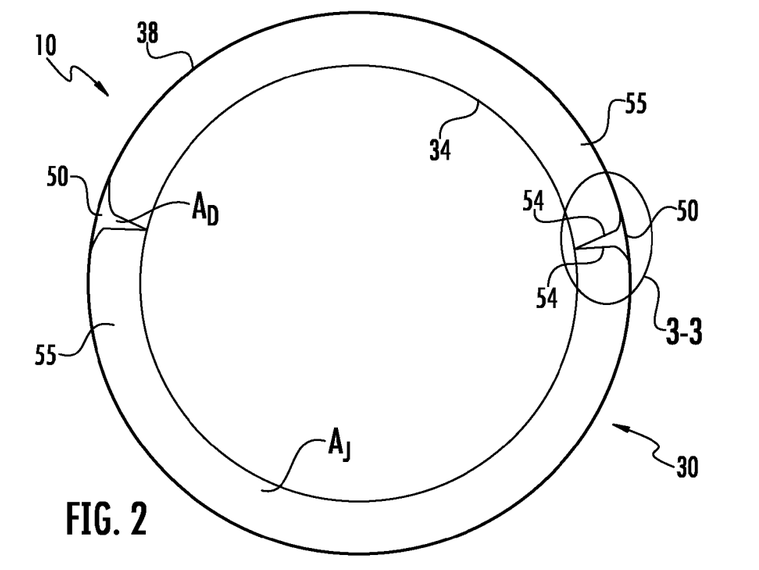
FIG. 2 is a cross-section of the cable jacket illustrated in FIG. 1.

FIG. 2 is a cross-section of the jacket 30 in isolation, taken on a plane perpendicular to a length of the cable 10. In the exemplary embodiment, the discontinuities 50 are bonded to the main portion of the jacket 55 when the jacket 30 is extruded. The main portion 55 and the discontinuities 50 can be formed from extrudable polymers, so that as the extrudates used to form the main portion 55 and the discontinuities 50 cool and solidify, the extrudates become bonded to a desired degree at an interface 54 on each side of a discontinuity 50. When the discontinuities 50 are formed while extruding in the same step as the main portion 55 of the jacket, the bond between discontinuity 50 and the remainder of the jacket 30 can be generally described as enabled by polymer chain entanglement as the jacket 30 solidifies. The jacket 30 accordingly comprises a cohesive composite polymer structure. In FIG. 2 the interfaces 54 are shown as clear delineations, while in practice there may be a transition region between the materials of the main portion 55 and the discontinuities 50. The curved "T" or "shark tooth" shapes of the discontinuities 50 in FIG. 2 are a result of the extrusion process used to form the discontinuities, but other shapes are possible.

The discontinuities 50 can be strips that may each occupy up to, for example, 5% of the total jacket cross-sectional area AJ. In exemplary embodiments, discontinuities 50 can be relatively narrow strips in the jacket 30, and may occupy relatively small portions of the jacket cross-sectional area AJ. For example, the discontinuities 50 can have cross-sectional areas AD that are less than 3% of AJ. In the illustrated embodiment, the discontinuities 50 each have cross-sectional areas AD that are less than 2% of AJ. In FIGS. 1 and 2, two discontinuities 50 are formed in the jacket 30 to facilitate opening of the jacket as shown in FIG. 1. Depending on the form that the core 20 takes, the number, spacing, shape, composition and other aspects of the discontinuities 50 can be varied. For example, a single discontinuity in the jacket 30 may be sufficient to allow the cable jacket 30 to be opened away from the core 20.

Figure 3:
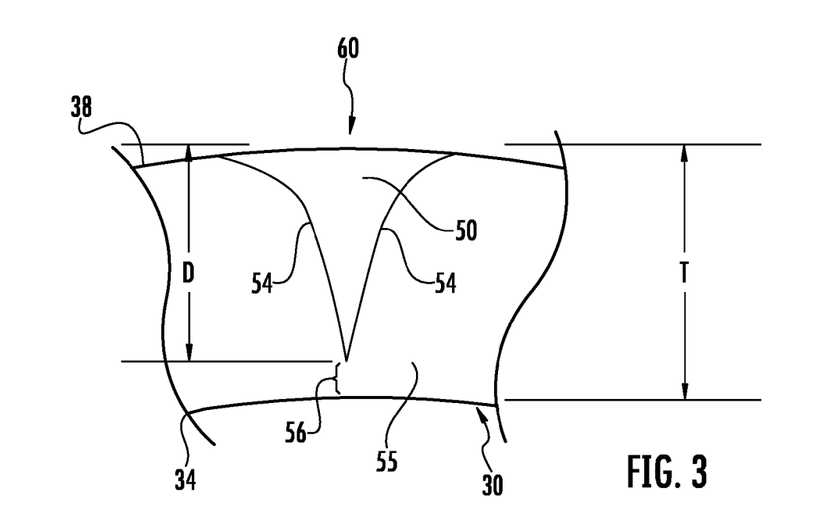
FIG. 3 is an isolated cross-sectional view of one of the discontinuities in the cable jacket of FIG. 2.

FIG. 3 is an isolated view of one of the discontinuities 50 in the jacket 30. In the illustrated embodiments, the width of the discontinuity 50 is much greater near the exterior surface 38 of the jacket 30 than at the radially inward portion of the discontinuity 50. The discontinuities 50 can accordingly form a small, visible portion of the exterior surface of the cable jacket 30. This is due to the manufacturing process used to form the exemplary jacket, in which the extrudate used to form the discontinuity 50 is introduced from the direction 60 into the extrudate material used to form the main portion 55. The discontinuities 50 are progressively narrower as they extend radially inwardly. The discontinuity extends a depth D into the jacket 30, which has a thickness T. In exemplary embodiments, a discontinuity 50 may extend from the exterior surface 38 to the depth D, leaving a gap 56 that is contiguous with main portion 55. Gap 56 may be from about 0.2 millimeter (mm) to about 0.4 mm, and in exemplary embodiments the gap 56 is about 0.3 mm. In other embodiments, discontinuity 50 may extend essentially from the exterior surface 38 to the interior surface 34 of the jacket 30. The depth D need not equal the thickness T, however. For example, discontinuities having depths D of at least 80% of the thickness T may be effective in providing shear locations for tearing the jacket 30. Discontinuities having depths D of at least 50% of the thickness T may also be effective in providing shear locations for tearing the jacket 30.

The materials and processes used to form the main portion 55 and the discontinuities 50 can be selected so that the interfaces 54 allow for relatively easy access to the core 20 by tearing the jacket 30 as shown in FIG. 1. The cable 10 may be constructed to meet other requirements for robustness, such as requirements for the jacket 30 stay intact under tensile loads, twisting, in temperature variations, and when subjected to other known cable test criteria, such as, for example, ICEA 460, and GR20.

The cable jacket main portions 55 and the discontinuities 50 described in this specification may be made from various polymer materials. Either the main portion 55 or the discontinuities 50 may be made from polypropylene (PP), polyethylene (PE), or blends of materials such as a blend of PE and ethylene vinyl acetate (EVA), flame-retardant material such as flame-retardant polyethylene, flame-retardant polypropylene, polyvinyl chloride (PVC), or polyvinylidene fluoride (PVDF), filled materials such as polybutylene terephthalate (PBT), a polycarbonate and/or a polyethylene (PE) material and/or an ethylene vinyl acrylate (EVA) or other blends thereof having fillers like a chalk, talc, or the like, and other materials such as a UV-curable acrylates.

In the exemplary embodiments, the main portion can be extruded from a first material comprising at least 80% of a first polymer, polyethylene, by weight, and the discontinuities can be extruded from a second material comprising at least 70% of a second polymer, polypropylene, by weight and additionally at least 0.5% of the first polymer polyethylene by weight. Higher amounts by weight of the first polymer may be included in the second material, such as at least 1.0%, or at least 2%. Without being bound by theory, Applicants believe the bond between polypropylene and polyethylene may be caused by one or both of quantities of ethylene that are compounded in the polypropylene bonding with the polyethylene, and molecular entanglement between the PE and PP. According to this understanding, the amount of ethylene in the PP extrudate can be increased to increase the bond between the discontinuities and the remainder of the jacket. In one embodiment, the main portion 55 is made from a first polyethylene extruded material, such as a medium density polyethylene (MDPE). The discontinuities 50 are made from a second, polypropylene/polyethylene blend of extruded material, the blend including from 6% to 20% polyethylene, with the remainder of the blend being primarily a polypropylene material.

The first polymer may be a polyethylene and the second extruded material may be a polypropylene/polyethylene blend, the blend including up to about 20% by weight of the polyethylene.

The cable 10 can be manufactured using existing coextrusion equipment subject to minor modifications. For example, extruders from the Davis-Standard line of wire and cable extruders can be used to form a cable jacket according to the present embodiments. For example, a 1½ inch (40 mm) barrel diameter extruder and a larger barrel diameter extruder, such as a 3, 4, or 4½ inch extruder available from Davis-Standard, can be screwed into a crosshead in a configuration that would conventionally be used to extrude a cable jacket with the larger extruder, and to extrude a stripe on the exterior of the cable jacket with the smaller extruder. In a conventional process, the stripe extrudate material is deposited on the surface of the jacket extrudate. According to the present embodiment, the flow of extrudate in the jacket extruder is diverted at the location or locations where the stripe extrudate material is introduced to the jacket extrudate. The diversion of the jacket extrudate creates a depression or trough in the flow of jacket extrudate, into which the extrudate material used to form a discontinuity is introduced. The jacket extrudate along with the discontinuities formed therein then contracts and solidifies around a fiber optic core advancing through the crosshead.

Figure 4:
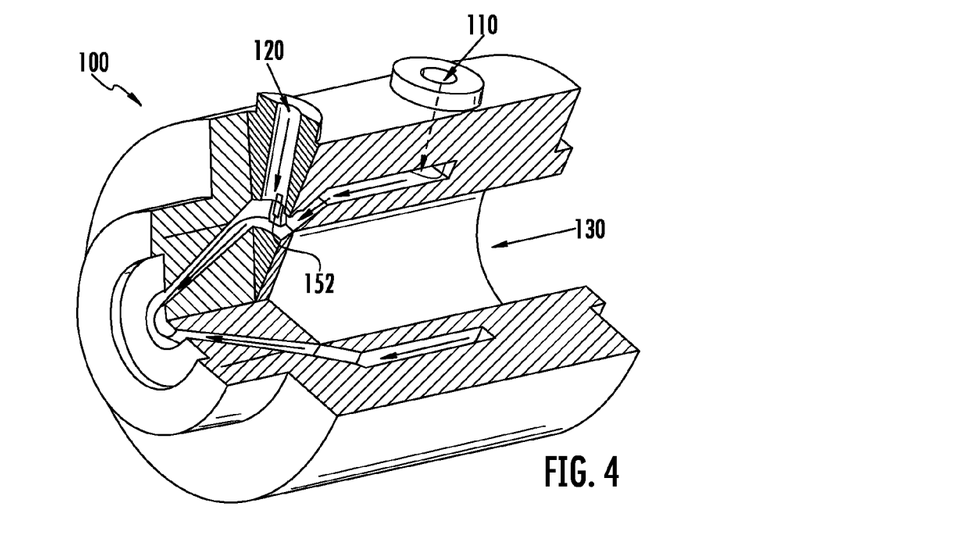
FIG. 4 is a cutaway view of a coextrusion apparatus used to manufacture cables with discontinuities.
Figure 5:
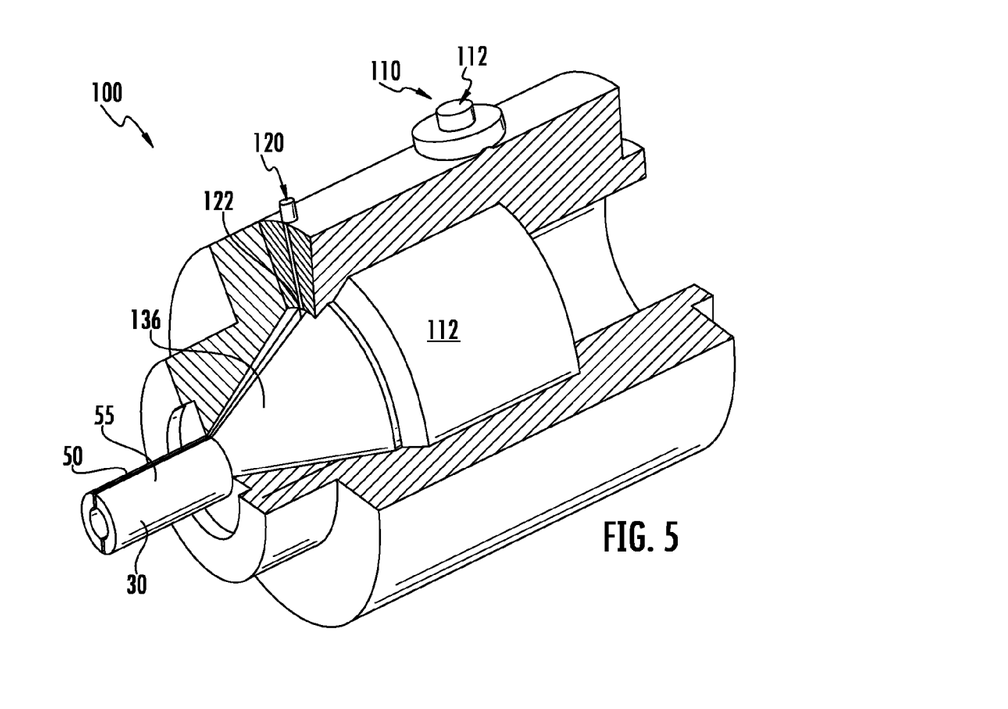
FIG. 5 is a cutaway view of the coextrusion apparatus of FIG. 4 illustrating extrudate material flow.

FIG. 4 illustrates a cutaway section view of a coextrusion apparatus 100 that can be screwed into a crosshead and used to manufacture a cable according to the present embodiments. The arrows in FIG. 4 illustrate the flow direction of extrudate. FIG. 5 illustrates the coextrusion apparatus 100 including representations of the extrudate materials forming the jacket 30. The apparatus 100 can generally be constructed from commercially available components used in a cable jacketing line with the capability to extrude stripes on a cable jacket, except for the modification described below. Referring to FIGS. 4 and 5, the apparatus 100 includes a first input port 110 that receives a first molten extrudate material 112 that is used to form the main portion 55 of the jacket 30. A second input port 120 allows introduction of a second molten extrudate material 122 used to form the discontinuities 50. A cavity 130 houses a tip (not shown) that in part defines the shape of the extrusion cone 136, and the ultimate form of the cable jacket.

Figure 6:
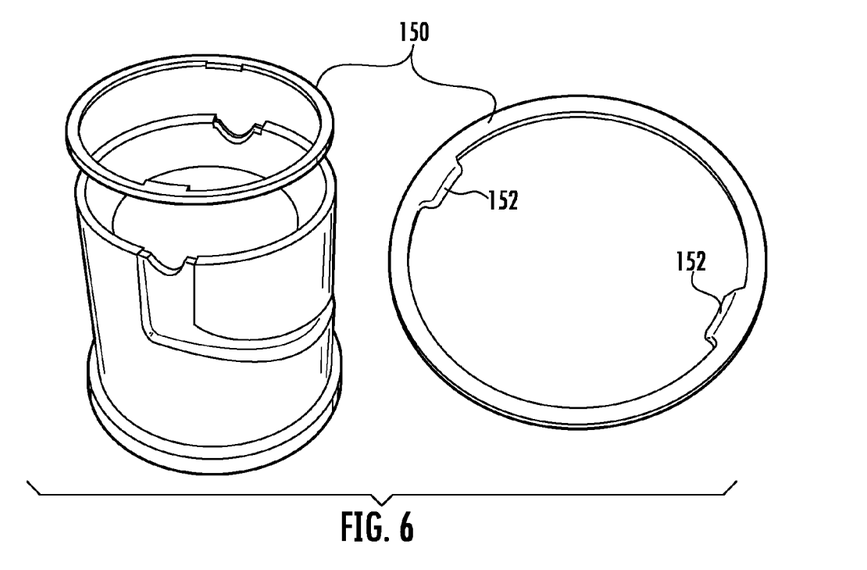
FIG. 6 illustrates a ring that can be used to modify conventional coextrusion devices to form discontinuities.

FIG. 6 illustrates a ring 150 that may be inserted in the apparatus 100 that enables formation of the discontinuities in the flow of the first extrudate material 112. The ring 150 includes two projections 152 that act to divert the flow of the first extrudate 112. The projections 152 divert the flow of the first extrudate 112 and create a trough or depression in the extrudate flow, into which the second extrudate material 122 flows.

Referring to FIG. 5, to form a fiber optic cable 10, a cable core (not shown) is advanced along the centerline of the apparatus 100. First extrudate material 112 is pumped into the first input port 110, which then advances through channels in the apparatus 100 and travels over the tip (not shown). The projections 152 divert the flow of extrudate 112 and create troughs. At these locations, the second extrudate material 122 is introduced into the troughs. In exemplary embodiments, a space (not shown) between the innermost surfaces of projections 152 and the inner cone of apparatus 100 allows extrudate 112 to flow underneath projections 152, creating a contiguous flow of extrudate 112 beside and beneath the second extrudate material 122. The second extrudate material 122 therefore flows as a liquid in the flow of first extrudate material 112 as the jacket is extruded. The extrusion cone 136, which is comprised of the first and second extrudate materials 112, 122, cools and solidifies around the core to form the jacket 30.

Figure 7:
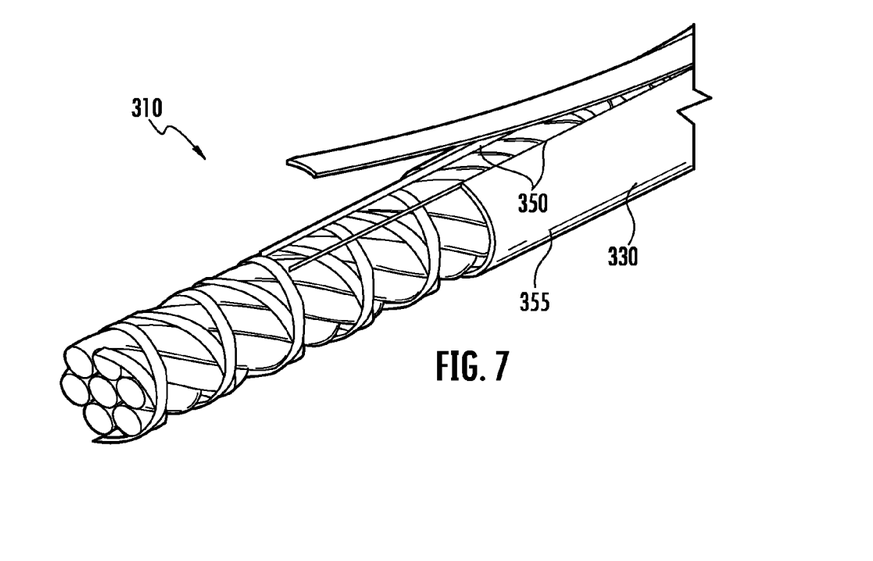
FIG. 7 is a partial cutaway view of a fiber optic cable according to a second embodiment.

FIG. 7 is a partial cutaway view of a fiber optic cable 310 that can be constructed using the processes described herein, with relatively closely spaced discontinuities. The cable 310 has a core 320 surrounded by a jacket 330, similar to the embodiment shown in FIG. 1. The jacket 330 includes a pair of discontinuities 350 that extend along the length of the cable 330. In this embodiment, the discontinuities 350 are relatively close together so that a narrow strip of jacket 330 can be peeled away from the core 320. The discontinuities 350 each occupy less than 5% of the total jacket area AJ of the cable 310, and are separated by an angular distance of less than 60 degrees. For a relatively narrow strip providing easy tearing from the remainder of the cable, the angular separation can be less than 30 degrees.

According to the present embodiments, one or more discontinuities in a cable jacket can be arranged to provide relatively easy access to a cable core. The ease of access can be defined, for example, by the force required to pull, or peel away a section of the cable jacket at one or more discontinuities. The peel force can be measured as a direct force measurement, in Newtons, of the force a person must exert as the jacket section is peeled away from the cable core. It is understood that the jacket will not be perfectly uniform, and that a person or machine cannot exert a perfectly uniform force as the jacket is peeled, so "peel forces" described in this specification indicate an average force exerted as a distance of the jacket section is peeled back. It is also understood that peel forces according to the present embodiments are measured without any additional modifications to the cable jacket exterior, such as by scoring. The peel forces can be relatively low when compared to the forces required to access a cable without extruded discontinuities. For example, a peel force required to peel the narrow strip of jacket 330 shown in FIG. 7 may be less than about 80 Newtons (N). In exemplary embodiments, the peel force required may be from about 10N to about 50N, and in yet further exemplary embodiments may be from about 20N to about 40N. Peel forces are defined herein to include any force great enough to cause the jacket material to rip, tear, or otherwise separate along the discontinuities 50, 350 for accessing the cable core. Spaced discontinuities, such as those shown in FIGS. 2 and 7, allow access at relatively low peel forces. Narrowly spaced discontinuities such as those shown in FIG. 7 provide easy access at very low peel forces.

It is relatively easy to measure peel force. Using cable 10 (FIG. 1) as a reference, about 25 mm of jacket is cut away from one end of the cable 10. The ends of the cable 10 are secured to a bench or other sturdy surface. A small hole is placed in the jacket proximal to the edge of the jacket where it was cut away from the core, and one end of an "S" hook is inserted into the hole in the jacket. If the cable includes a pair of spaced discontinuities, the hole is formed midway between the two discontinuities. A lanyard or wire is attached to the other end of the S hook. The lanyard is fixed to a force gauge, such as a Chatillon gauge available from Ametek Test and Calibration Instruments of Largo, Fla. The force gauge is pulled by hand or by some mechanical means, away from the cable at an angle of 45 degrees to the cable centerline, until the section of the jacket attached to the S hook peels away from the rest of the jacket. The jacket section is pulled for a distance of 250-500 mm away from the initial jacket removal location. The average peel can be calculated as the average force measured by the force gauge as the jacket section is pulled along the selected distance.

In an alternate method of measuring peel force, a force testing machine, such as those available from Instron®, pulls the section of cable away from the remainder of the cable at angle of 90 degrees to the remainder of the cable 10. The cable is secured to a linear slide that translates the cable beneath the portion of the machine that is secured to the jacket section being peeled away. In this arrangement, the cable 10 slides beneath the force gauge that measures the tension on the section being removed, so that the section can be peeled away at a 90 degree angle. The tension in the removable section can be averaged over a desired distance to obtain the average peel force.

Figure 8:
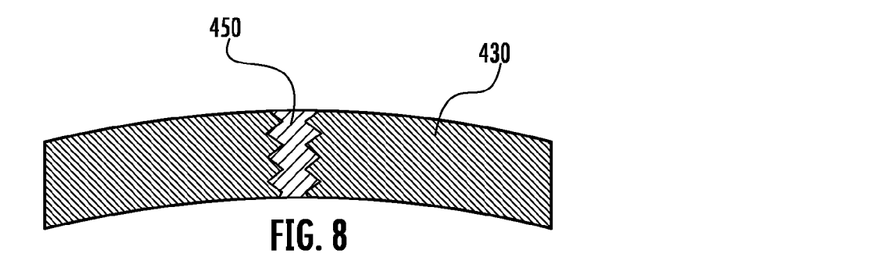
FIGS. 8-11 are isolated cross-sectional views of alternate embodiments of the discontinuities in a cable jacket.
Figure 9:
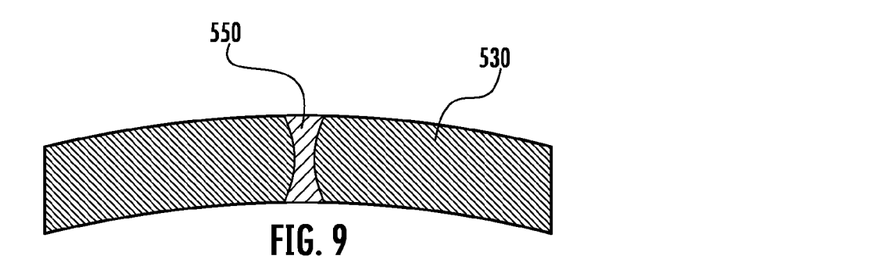
Figure 10:
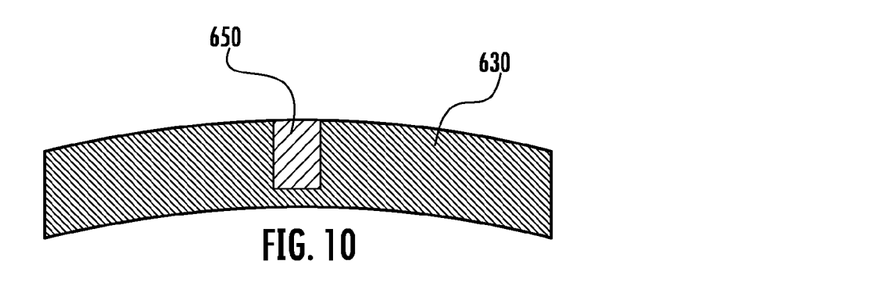
Figure 11:
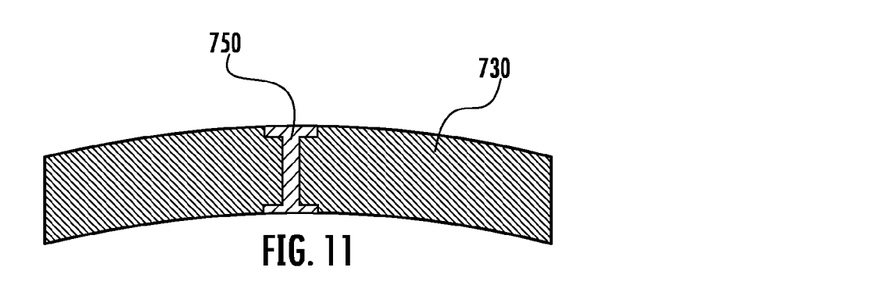

FIGS. 8-11 are isolated cross-sectional views of exemplary alternate embodiments of discontinuities. In FIG. 8, the main portion 430 has discontinuity 450 disposed therein with a substantially serrated cross-section. In FIG. 9, the main portion 530 has an "hourglass" cross-section. Discontinuities 450 and 550, for example, may extend from respective exterior surfaces to respective interior surfaces of respective main portions 430 and 530. In FIG. 10, the main portion 630 has a generally rectangular shape discontinuity 650 that extends from the exterior surface of the main portion 630. The discontinuity 650 extends only partially through the main portion 630 and leaves a gap 656, similar to the gap 56 illustrated in FIG. 3. FIG. 11 shows yet another example of a main portion 730 having a discontinuity 750 but having a substantially "I" shaped cross-section. The discontinuity 750 extends from the exterior surface of main portion 730 to the interior surface.

Figure 12:
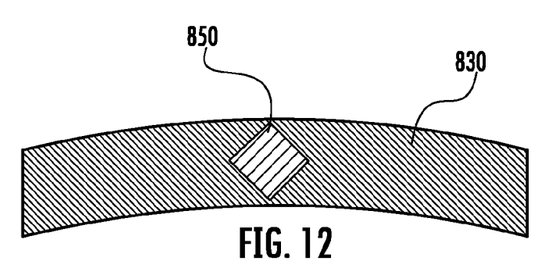
FIGS. 12-15 are isolated cross-sectional views of further alternate embodiments of the discontinuities in a cable jacket.
Figure 13:
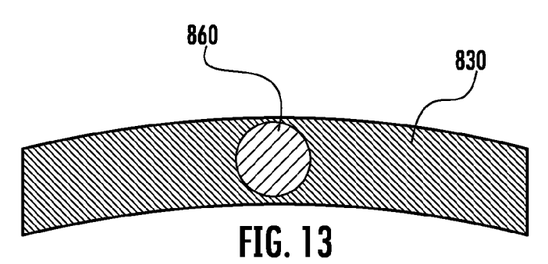
Figure 14:
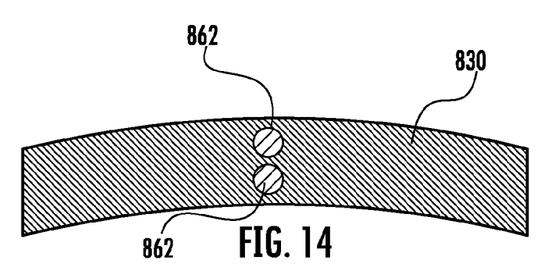
Figure 15:
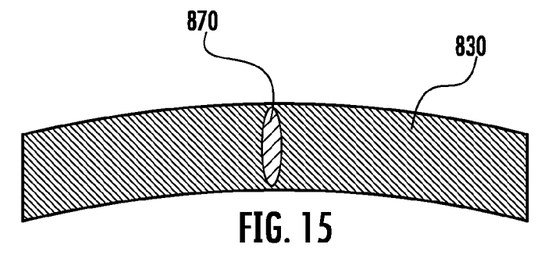

FIGS. 12-15 are isolated cross-sectional views of further embodiments of discontinuities that are wholly encased or embedded in the main portion of the cable jackets, as opposed to extending to the cable exterior. FIG. 12 illustrates a main portion 830 with a wholly embedded discontinuity 850 disposed therein having a substantially rectangular cross-section, with a diagonal axis of the rectangle generally aligned with a radius of the cable. FIG. 13 illustrates a main portion 860 having a wholly embedded discontinuity 830 disposed therein with a substantially round cross-section. FIG. 14 illustrates a main portion 830 having a pair of wholly embedded discontinuities 862 disposed therein, each having a substantially round cross-section. In FIG. 14, the two discontinuities 862 are arranged on a line that can coincide with a radius of the cable. FIG. 15 illustrates a main portion 830 with a wholly embedded discontinuity 870 having a substantially ovoid shaped cross-section.

Figure 16A:
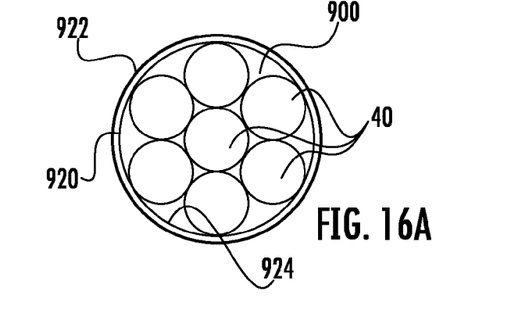
FIGS. 16A-16C illustrate an alternate method of making a cable jacket with discontinuities in two extruded layers.
Figure 16B:
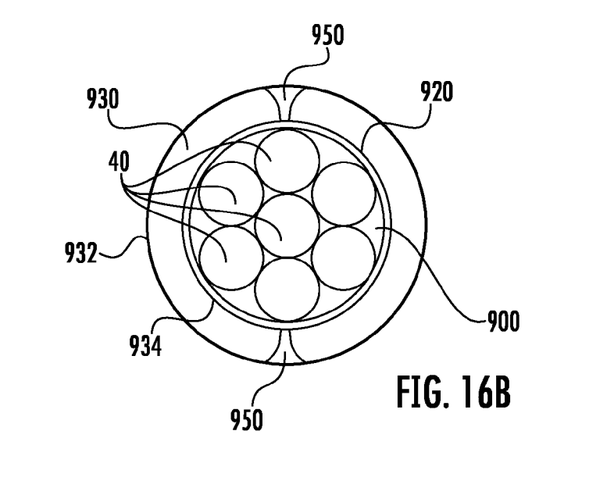
Figure 16C:
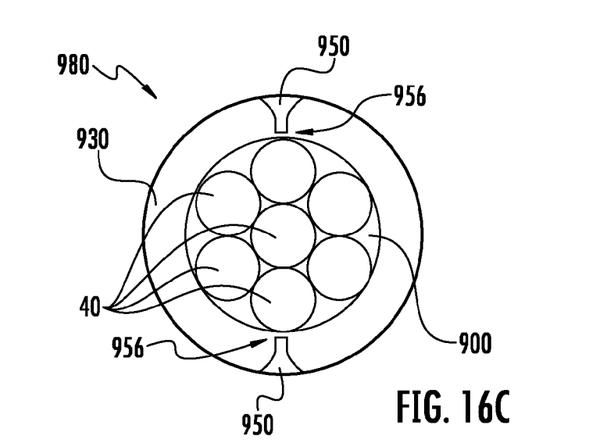

FIGS. 16A-16C illustrate an alternative method of forming a cable jacket in which an exterior jacket with one or more discontinuities in extruded over an inner jacket layer. Referring to FIG. 16A, a core 900 is advanced along a process direction in a cable jacketing line. The core 900 may include, for example, at least one optical fiber 40, a plurality of optical fibers, buffered fibers, ribbon fibers, binders, and/or combinations thereof. The core 900 is passed through an extrusion apparatus having an extruder head, where a first, inner jacket layer 920 is extruded around core 900, enclosing the core 900 as shown in FIG. 16A. The first jacket layer 900 can be formed from a first polymeric material such as a polyethylene. The first jacket layer 900 may be from about 0.1 mm to about 0.6 mm thick, and in exemplary embodiments in the range of 0.3-0.4 mm. The first jacket layer 920 has an exterior surface 922 and an interior surface 924, the interior surface 924 being adjacent to and in some cases contacting the core 900.

Referring to FIG. 16B, the core 900 and the first, inner jacket layer 920 are advanced to a second extrusion apparatus having a second extruder head, where a second jacket layer 930 is extruded over the first jacket layer 920. The second jacket layer 930 can abut and, if desired, at least partially bond with the first, inner jacket layer 920.

In exemplary embodiments, the second, outer jacket layer 930 may also be formed from the same material as the first, inner jacket layer 920. The second jacket layer 930 may be from about 0.5 mm to about 1.0 mm thick, and in exemplary embodiments may be about 0.7 mm thick. The second jacket layer 930 can be formed using an apparatus similar to that shown in FIGS. 4-6, where one or more troughs are formed by a projection extending into the first extruded material flow path and a second extruded material is introduced into the trough to form a discontinuity 950 in second jacket layer 930. The discontinuities 950 may extend radially up to 100% of the thickness of the second layer 930. The first layer 920, the second layer 930 and the discontinuities 950 draw down and cool around core 900.

Referring to FIG. 16C, if the first jacket layer 920 and the second jacket layer 930 are made from substantially the same extrudate material, the two layers 920, 930 blend and form a bond that effectively eliminates, for example, any weld line, stitch line, inconsistency, or incongruence that may cause a likely high stress area between the respective layers 920, 930. In other words, the first layer 920 and the second layer 930 form a uniform homogeneous layer of first extruded material, with one or more discontinuities formed 950 therein. The two layers 920, 930 and the discontinuities 950 thus form a unitary composite structure. FIG. 16C illustrates a cable embodiment 980 formed according to this method. A gap 956 of the first extrudate material, which corresponds to that portion of the first jacket layer 920, can remain between each discontinuity 950 and the core 900.

In general, the separation properties disclosed in this specification may be obtained by coextruding the discontinuities from a different material than the material used to form the main portion of the jacket. As an alternative method, the discontinuities may be made from the same material as the remainder of the jacket, but subjected to different curing conditions, for example.

What is claim is:
1. A cable, comprising:
a core including a plurality of optical fibers; and
a jacket surrounding the core, wherein the jacket has an interior surface and an exterior surface with a jacket thickness therebetween of no more than 2.0 mm, the jacket comprising:
  a main portion of a first material, wherein the first material is extrudable, and wherein the first material is polymeric; and
  at least a first and a second discontinuity of a second material disposed in the main portion, wherein the second material is extrudable, wherein the second material is polymeric,
  wherein the main portion includes a section of the main portion located between the first and second discontinuities that is separable from another portion of the jacket by application of a peel force exerted on the section to cause the jacket material to rip, tear, or otherwise separate along the first and second discontinuities for accessing the core, and wherein the peel force is at least 10 N.

2. The cable of claim 1, wherein the peel force is less than 80 N.

3. The cable of claim 1, wherein the first and second discontinuities are wholly embedded in the main portion.

4. The cable of claim 1, wherein the jacket thickness is at least 0.5 mm.

5. The cable of claim 1, wherein a cross-sectional area of each discontinuity is less than 5% of a cross-sectional area of the jacket.

6. A cable, comprising:
a core including a plurality of optical fibers; and
a jacket surrounding the core, wherein the jacket has an interior surface and an exterior surface with a jacket thickness therebetween of no more than 2.0 mm, the jacket comprising:
  a main portion of a first material, wherein the first material is extrudable, and wherein the first material is polymeric; and
  at least a first and a second discontinuity of a second material disposed in the main portion, wherein the second material is extrudable, wherein the second material is polymeric,
  wherein the main portion includes a section of the main portion located between the first and second discontinuities that is separable from another portion of the jacket by application of a peel force exerted on the section to cause the jacket material to rip, tear, or otherwise separate along the first and second discontinuities for accessing the core, and wherein the peel force is less than 80 N.

7. The cable of claim 6, wherein the first material includes a first polymer and the second material is a blend that includes a second polymer and the first polymer.

8. The cable of claim 6, wherein the first and second discontinuities are wholly embedded in the main portion.

9. The cable of claim 6, wherein the jacket thickness is at least 0.5 mm.

10. The cable of claim 6, wherein each discontinuity has a substantially ovoid shaped cross-section.

11. A cable, comprising:
a core including a plurality of optical fibers; and
a jacket surrounding the core, wherein the jacket has an interior surface and an exterior surface with a jacket thickness therebetween of at least 0.5 mm, the jacket comprising:
a main portion of a first material, wherein the first material is extrudable, and wherein the first material is polymeric; and
at least a first and a second discontinuity of a second material disposed in the main portion, wherein the second material is extrudable, wherein the second material is polymeric,
wherein the main portion includes a section of the main portion located between the first and second discontinuities that is separable from another portion of the jacket by application of a peel force exerted on the section to cause the jacket material to rip, tear, or otherwise separate along the first and second discontinuities for accessing the core, and wherein the peel force is at least 10 N.

12. The cable of claim 11, wherein the peel force is less than 80 N.

13. The cable of claim 11, wherein the first and second discontinuities are wholly embedded in the main portion.

14. The cable of claim 11, wherein molecular entanglement between the first material of the main portion and the second material of the discontinuities bonds the discontinuities to the main portion of the jacket.

15. The cable of claim 11, wherein the jacket has an annular cross-section.

16. A cable, comprising:
a core including a plurality of optical fibers; and
a jacket surrounding the core, wherein the jacket has an interior surface and an exterior surface with a jacket thickness therebetween of at least 0.5 mm, the jacket comprising:
a main portion of a first material, wherein the first material is extrudable, and wherein the first material is polymeric; and
at least a first and a second discontinuity of a second material disposed in the main portion, wherein the second material is extrudable, wherein the second material is polymeric,
wherein the main portion includes a section of the main portion located between the first and second discontinuities that is separable from another portion of the jacket by application of a peel force exerted on the section to cause the jacket material to rip, tear, or otherwise separate along the first and second discontinuities for accessing the core, and wherein the peel force is less than 80 N.

17. The cable of claim 16, wherein the first and second discontinuities extend substantially along the entire length of the cable.

18. The cable of claim 16, wherein the first and second discontinuities are wholly embedded in the main portion.

19. The cable of claim 16, wherein the first material comprises polyethylene.

20. The cable of claim 16, wherein the first and second discontinuities extend along the entire length of the cable.

\* \* \* \* \*